Figure 1:
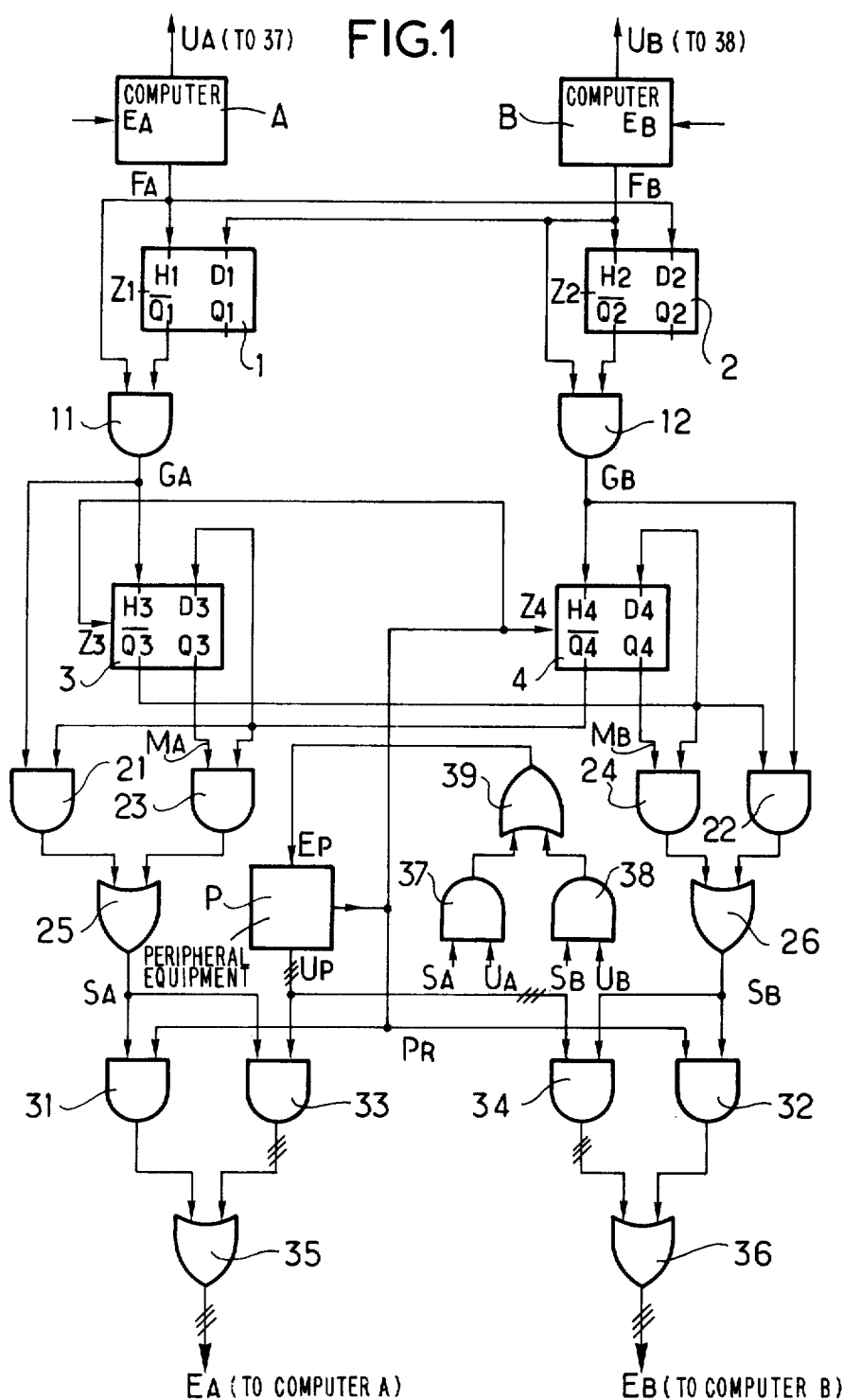

United States Patent [19]

Salle et al.

[11] 3,934,230

[45] Jan. 20, 1976

[54] AUTOMATIC SELECTOR FOR PERIPHERAL EQUIPMENT

[75] Inventors: Yves Sallé, Boulogne-sur-Seine; Marcel Pincemin, Ris Orangis, both of France

[73] Assignee: Compagnie Industrielle des Telecommunications Cit-Alcatel, France

[22] Filed: Dec. 28, 1973

[21] Appl. No.: 429,201

[30] Foreign Application Priority Data
Dec. 28, 1972 France .............................. 72.46631

[52] U.S. Cl. .............................................. 340/172.5
[51] Int. Cl.² ...................... G06F 3/00; H04Q 3/00
[58] Field of Search .......... 340/172.5, 147 LP, 151, 340/152, 152 R, 153, 146.1 C, 146.1 D; 179/17 B, 18 AB, 19, 20, 38

[56] References Cited
UNITED STATES PATENTS

| | | |
|---|---|---|
| 3,252,149 | 5/1966 | Weida et al. ..................... 340/172.5 |
| 3,374,465 | 3/1968 | Richmond et al. .............. 340/172.5 |
| 3,395,394 | 7/1968 | Cottrell, Jr. ....................... 340/172.5 |
| 3,395,398 | 7/1968 | Klein ................................. 340/172.5 |
| 3,473,155 | 10/1969 | Couleur et al. ................... 340/172.5 |
| 3,492,648 | 1/1970 | Olsen et al. ................... 340/172.5 X |
| 3,553,656 | 1/1971 | Bernhardt ........................ 340/172.5 |
| 3,735,357 | 5/1973 | Maholick et al. ................ 340/172.5 |
| 3,798,591 | 3/1974 | Phillips et al. .................... 340/172.5 |

*Primary Examiner*—Gareth D. Shaw
*Assistant Examiner*—Michael C. Sachs
*Attorney, Agent, or Firm*—Craig & Antonelli

[57] ABSTRACT

Automatic selector for peripheral equipment capable of operating alternately with one or the other of two computers, enabling, at a given instant the setting up of the connection with only one of the two computers exclusive of the other without predetermined order of priority between the computers.

8 Claims, 2 Drawing Figures

AUTOMATIC SELECTOR FOR PERIPHERAL EQUIPMENT

The invention comes within the branch of data processing by an electronic computer exchanging data with a peripheral element. It concerns an automatic selector for peripheral equipment capable of operating alternately with either one or the other of two computers, enabling, at a given instant, the setting up of the connection with only one of the two computers exclusively of the other without a predetermined order of priority between the two computers. It is applied to data processing centers in which a peripheral equipment may be contacted by one or the other of two computers.

When in accordance with the prior art, a computer under the control of a program proceeds with an input or an output of data, or again with the examining of the state of a peripheral equipment, it applies, to address lines, a code corresponding to the number of the peripheral equipment. That code exists throughout the whole duration of the operation. There exists between the computer and the peripheral equipment an element called a coupler, which decodes the address, and the logic signal thus obtained opens the gates disposed in the connection lines of the coupler with the computer such as in the data input lines and data output lines, clocklines, etc.

On the other hand, the normal procedure of operation with peripheral equipment requires the knowledge of the state of that peripheral equipment. The peripheral equipment provides, for that purpose, a "ready to exchange data" logic signal. If that signal is in the state 1, the peripheral equipment is available and can receive or supply a word. In the contrary case (for example, print-out machine in the process of printing) the peripheral equipment is not available, the "ready" signal is at zero.

The computer is therefore connected to the peripheral equipment a first time to examine if the peripheral equipment is ready to exchange data and a second time if it is ready, to perform a data input or a data output.

It will be seen that in accordance with the prior art a peripheral equipment is effectively connected to a computer only by its address decoding signal.

In certain installations, arrangements are provided for the same peripheral equipment to be connected to one or the other of two computers A, B. The coupler receives independently the address lines and the data lines of the two computers. The peripheral equipment has only one line of data. The coupler therefore has a selector ensuring the connection of the data lines of the peripheral equipment to the data lines of one or the other of the two computers.

The selector in accordance with the present invention fulfills the following conditions:

1. Selection is made according to addresses. The peripheral equipment is connected to the computer which has addressed it. Priority is granted to the first computer, for example A, which has sent out its address code. If, during the sending out of the address code of A (designated for example by FA), B begins to send out its address code (designated by FB), the code FB is blocked throughout the whole duration of the sending out of code FA.

2. If the peripheral equipment was ready at the instant of the sending out of the code FA, it was effectively connected to the computer A, the connecting of the peripheral equipment to A is maintained until the disappearance of the "ready" signal; an address code FB arriving during that interval is blocked: the computer A retains the exclusive use of the peripheral equipment during the whole of the time which the operation lasts. Only when the "ready" signal has returned to zero is an address code FB able to cause the connecting of the peripheral equipment with B.

The logic arrangement according to the invention ensures the connections of the peripheral equipment either with the computer A or with the computer B, according to these preceding conditions.

It comprises, for that purpose a first stage formed by two bistable flip-flops and two AND gates, which, receiving the address codes FA, FB, supplies pre-selection signals, designated respectively by GA, GB; and a second stage formed by two bistable flip-flops and annexed logic circuits, which, receiving the signals GA and GB and the "ready" signal (PR) coming from the peripheral equipment, sends out one of two "selection of A" (SA) or "selection of B" (SB) signals. The first stage ensures the blocking of an address code (for example FB) during the sending out of the other address code (for example FA). The second stage ensures the blocking of the address code of B (FB) if it arrives while peripheral equipment is connected to A, as long as the "ready" signal (PR) has the valency 1.

Figure 2:
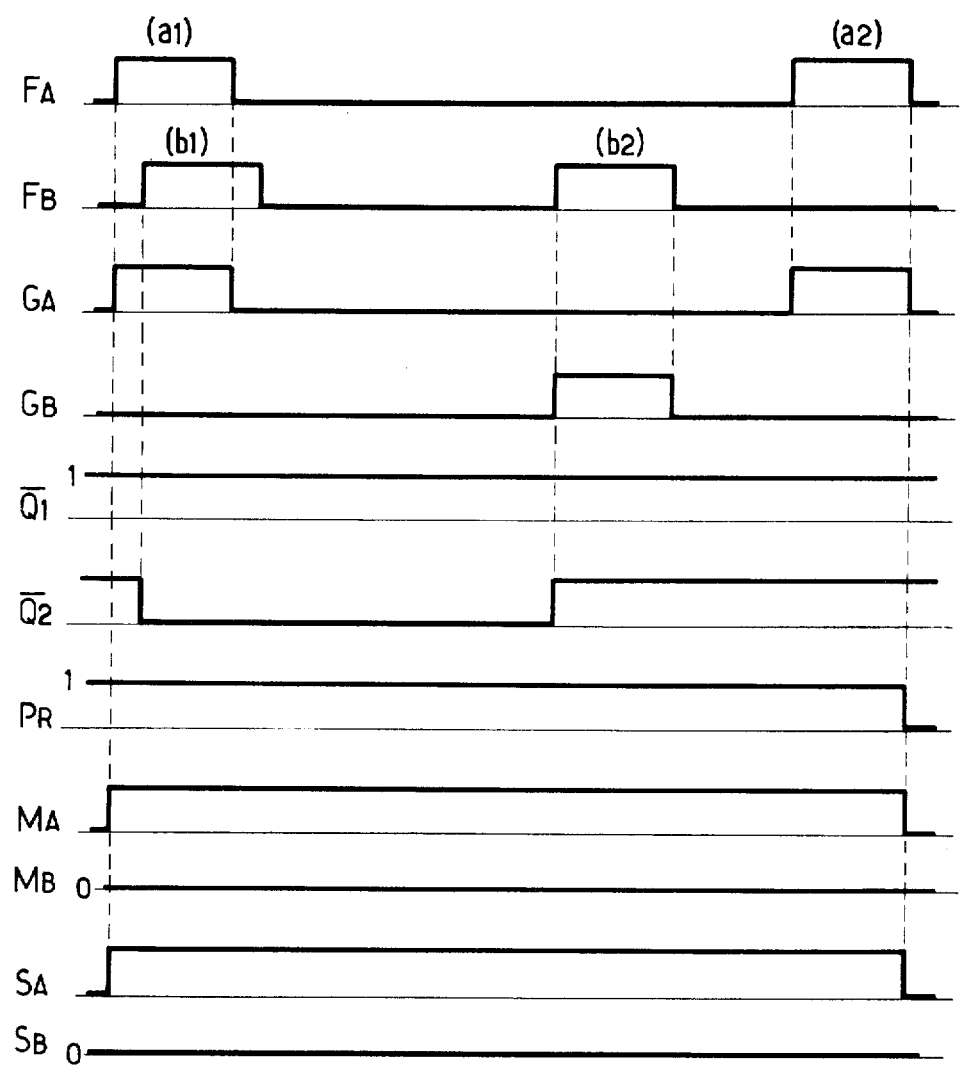

The invention will be described in detail with reference to the accompanying figures, among which:

FIG. 1 shows a general diagram of the device according to the invention, in a preferred embodiment;

FIG. 2 comprises graphs showing the valencies of several signals during a selection and using of the peripheral equipment by one of the computers.

In FIG. 1, the symbols A and B designate two computers capable of operating with the same peripheral equipment P. Also, EA is the input of A;
EB is the input of B;
UA is the output of A; UB is the output of B;
FA is the address or temporary request of A; FB is the address of B;
GA is the pre-selection of A; GB is the pre-selection of B;
MA is the maintaining of A; MB is the maintaining of B;
SA is the selecting of A; SB is the selecting of B;
P is the peripheral equipment;
EP is the input of the peripheral equipment;
UP is the "data" output of the peripheral equipment; and
PR is the ready for transaction signal.

In the figure, the connections are designated by the same symbols as the corresponding signals.

The bistable flip-flops of the first stage 1, 2 and of the second stage 3, 4 are preferably type-D flip-flops, with a control input D$i$, a clock pulse input H$i$, a resetting to zero input Z$i$, and outputs Q$i$ and $\overline{Qi}$, where $i$ designates the number of the flip-flop.

The address line FA of computer A is connected to clock input H1 and to control input D2. The address line FB of computer B is connected to clock input H2 and control input D1. An AND gate 11 has two inputs connected to FA and $\overline{Q1}$, respectively. An AND gate 12 has two inputs connected to FB and $\overline{Q2}$, respectively.

The output GA of gate 11 is connected to H3 to an input of an AND gate 21. The output GB of gate 12 is connected to H4 and to an input of an AND gate 22. The output Q3 is connected to an input of an AND gate 23 (signal MA); the output Q4 is connected to an input of an AND gate 24 (signal MB). The output $\overline{Q4}$ is connected to input D3, to a second input of gate 21 and to a second input of gate 23. The output $\overline{Q3}$ is connected to input D4, to a second input of gate 22 and to a second input of gate 24. The outputs of gates 21 and 23 are connected to the inputs of an OR circuit 25, whose output SA is connected to an input of an AND gate 31 and to an input of an AND gate 33. The outputs of gates 22 and 24 are connected to the inputs of an OR circuit 26 whose output SB is connected to an input of an AND gate 32 and to an input of an AND gate 34.

The line PR coming from the peripheral equipment P is connected to the terminal Z4. The line PR is also connected to an input of the AND gate 31 and to an input of the AND gate 32. The "data" output UP of the peripheral equipment is connected to an input of gate 33 and to an input of gate 34. The output signals of the gates 31 and 33 are connected together at the input of an OR circuit 35, whose output is connected to the input EA of computer A. The output signals of the gates 32 and 34 are brought together at the input of an OR circuit 36, whose output is connected to the input EB of computer B.

The outputs UA of computer A and UB of computer B are connected to the inputs EP of the peripheral equipment by two AND gates 37 and 38, under the control of the signals SA and SB, respectively, through an OR circuit 39. The elements 31 to 39 form a part of the coupler.

The operation of the circuit according to FIG. 1 will be described with reference to the graphs in FIG. 2, which contains eleven graphs showing the valency of eleven signals: FA, FB, GA, GB, $\overline{Q1}$, $\overline{Q2}$, PR, MA, MB, SA, SB during a picking up and using process of one of the two computers, taken as an example.

It is assumed that the computer A sends out to the peripheral equipment its address signal (FA) a first time (gating pulse $a1$), to check if the peripheral equipment is ready, then a second time (gating pulse $a2$) to exchange data with it. It will be shown that if the peripheral equipment is ready at the beginning of the gating pulse $a1$, the computer A has the exclusive use of the peripheral equipment during the whole of the interval from the beginning of the gating pulse $a1$ to the end of the gating pulse $a2$, whatever operations may be effected by the computer B.

Indeed, it is assumed that computer B sends out an addressing signal (FB)(gating pulse $b1$) during the signal FA. Whereas the gate 11 transmits the signal GA, the flip-flop 2 has a 1 on D2 when FB arrives; therefore it becomes tripped and $\overline{Q2}$, which was at 1, changes over to zero; therefore GB remains at zero at the output of gate 12.

It is assumed that B sends out a second gating pulse $b2$ before the appearance of $a2$. At that very instant, there is an 0 on D2; therefore the flip-flop 2 falls back; $\overline{Q2}$ reverts to the valency 1 and a signal GB is formed.

But as it is assumed that the signal PR is at 1, the signal GA has tripped the flip-flop 3. The result of this is MA = 1 and $\overline{Q3}$ is 0, therefore 0 is also applied on D4; the signal MB remains at zero. The result of this is the maintaining of SA = 1, as long as PR = 1 and SB still remains at zero.

When, after the second gating pulse $a2$, the peripheral equipment ceases to be ready, the signal PR falls back to zero and the signal SA is cancelled.

If the peripheral equipment is not ready when the signal GA (PR = 0) is applied, the signal SA is generated at the output of gate 25, through gate 21: it is then used to communicate to the computer A the state PR = 0.

It must be understood that the equivalent results would be obtained if B sends out its address before A.

There is no difference in the order of priority between the two computers.

It will easily be observed that the device according to the invention fulfills the conditions set in all cases of application.

The embodiment described is based on the use of D type bistable flip-flops, but within the scope of the invention, other types of flip-flops may be used.

While we have shown and described one embodiment in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are obvious to one of ordinary skill in the art.

What is claimed is:

1. An automatic selector associated with a peripheral equipment capable of exchanging data with one or the other of first and second computers for connecting the peripheral equipment to the computer which is the first to request connection to the peripheral equipment and for maintaining that connection until the selected computer is finished exchanging data, comprising a first selection stage including means responsive to address outputs representing request for connection to the peripheral equipment from said first and second computers for generating a first signal when said first computer request is the first received and for generating a second signal when said second computer request is the first received, a second selection stage connected to receive said first and second signals and including means responsive to a busy free output from said peripheral equipment representing the busy/free condition thereof and said first and second signals for generating a first selection signal when a first signal is received from said first selection stage and said peripheral equipment is free and for generating a second selection signal when a second signal is received from said first selection stage and said peripheral equipment is free, and coupler means for enabling the application of data from said first computer to said peripheral equipment in response to said first selection signal and for enabling the application of data from said second computer to said peripheral equipment in response to said second selection signal.

2. An automatic selector as defined in claim 1, wherein said first selection stage includes first and second flip-flops and first and second AND gates, one input of said first flip-flop and said first AND gate being connected to a connection request signal of said first computer, one input of said second flip-flop and said second AND gate being connected to a connection request signal of said second computer, the other input of said first flip-flop being connected to the connection request signal of said second computer, the other input of said second flip-flop being connected to the connection request signal of said first computer, the other input of said first and second AND gates being connected to an output of said first and second flip-flops, respectively, said first AND gate providing an output of the first signal of said first selection stage and said second AND gate providing an output of the second signal of said first selection stage.

3. An automatic selector as defined in claim 2 wherein said second selection stage includes third and fourth flip-flops each having one input connected to receive a respective one of said first and second signals from said first selection stage, third and fourth AND gates having each one input connected to one output of said fourth flip-flop, said third AND gate having another input receiving said first signal from said first selection stage and said fourth AND gate having another input connected to an output of said third flip-flop, and a first OR gate connected to the outputs of said third and fourth AND gates for providing said first selection signal.

4. An automatic selector as defined in claim 3 wherein said second selection stage further includes fifth and sixth AND gates each having one input connected to the other output of said third flip-flop, the other input of said fifth AND gate being connected to the other output of said fourth flip-flop and the other input of said sixth AND gate receiving said second signal from said first selection stage, and a second OR gate connected to the outputs of said fifth and sixth AND gates for providing said second selection signal.

5. An automatic selector as defined in claim 4 wherein said busy/free output from said peripheral equipment is connected to a reset-to-zero input of each of said third and fourth flip-flops.

6. In a data exchange system including a peripheral equipment having a ready for transaction signal output and data line means, and first and second computers having temporary request signal outputs and data line means, and an automatic selector for connecting one-at-a-time a respective computer data line to said peripheral equipment data line in response to the first temporary request signal supplied from one of said computers after completion of a data exchange, said automatic selector comprising:

a first selection stage including a first coupling means having an input receiving temporary request signals from said first computer and providing an output indicative thereof, a second coupling means having an input receiving temporary request signals from said second computer and providing an output indicative thereof, and an inhibit circuit means responsive to concurrent request signals from said first and second computers for disabling the coupling means that receives the secondly occurring request signal;

a second selection stage including first and second control means each capable of assuming either of first and second states, said first and second control means each having a reset input connected to the ready for transaction signal output of said peripheral equipment and each having a set input connected respectively to the output of said first and second coupling means, said first and second control means each assuming said first state in response to previously being reset and a signal occurring on the respective set input and assuming said second state when no signal occurs on the respective set input or said control means is not reset, and second inhibit means interconnecting said first and second control means for causing one of said first and second control means to assume said second state when the other thereof is in said first state; and data transfer gate means for coupling the data line means of a respective computer with the data line means of said peripheral equipment in response to the first state of said first and second control means.

7. An automatic selector as defined in claim 6, wherein said first and second coupling means each include an AND gate respectively providing the output thereof, and said inhibit circuit means includes first and second flip-flops each having two inputs receiving temporary request signals from respectively said first and second computers and each having a control-signal output, said flip-flops controlling respectively the AND gates of said first and second coupling means to open the AND gate which receives the first occurring temporary request signal and to block the AND gate which receives a secondly occurring temporary request signal.

8. An automatic selector as defined in claim 7, wherein said first and second control means respectively include third and fourth flip-flops each having a reset input connected to the ready for transaction signal output of said peripheral equipment and an input connected to the AND gate of the corresponding one of said first and second coupling means, and said inhibit means including means connecting an output of each of said third and fourth flip-flops to another input of respectively said fourth and third flip-flops.

* * * * *